UNITED STATES PATENT OFFICE.

ANDREW R. GREEN AND HARRY L. ROSCOE, OF JOPLIN, MISSOURI.

COMPOSITION FOR TREATING CONCRETE SURFACES.

1,371,555.     Specification of Letters Patent.     Patented Mar. 15, 1921.

No Drawing.     Application filed April 21, 1920. Serial No. 375,617.

*To all whom it may concern:*

Be it known that we, ANDREW R. GREEN, and HARRY L. ROSCOE, citizens of the United States, residing at Joplin, in the county of Jasper and State of Missouri, have invented certain new and useful Improvements in Compositions for Treating Concrete Surfaces, of which the following is a specification.

This invention relates to certain improvements in liquid compositions for treating a concrete surface, and it is primarily an object of the invention to provide a novel and improved composition or solution which serves to recrystallize the surface of old concrete and is adapted to be particularly used in connection with old concrete floors and platforms which have been subjected to hard wear due to trucking and the like.

Our improved composition or solution comprises a mixture of one gallon as follows:

| | |
|---|---|
| Aluminum sulfate | 16 oz. |
| Sulfuric acid | 1 oz. |
| Water | 111 oz. |

In mixing the composition, the aluminum sulfate is first added to the water and such mixture is stirred until all of the salt is dissolved and then the sulfuric acid is added. In practice, one gallon of the foregoing composition or solution is mixed with two gallons of water and which is applied as the first coating to the concrete surface to be treated. The surface is thoroughly wet with this solution and maintained wet for a period of about one and one-half hours. After this period, the surface is cleaned off by the use of rubber window squibs, or the like, and the concrete is then permitted to dry for one hour when a second coat of the solution or composition is applied. The second coat comprises one gallon of the composition or solution diluted within one and one-half gallons of water and which second coat is applied in the same manner as has just been referred to with respect to the first coat. For the third coat, one gallon of the solution or composition is diluted with one gallon of water and this third coat, when applied, is permitted to stand on the surface for a period of two hours and then cleaned off thoroughly and the surface permitted to thoroughly dry.

When our improved composition or solution is applied, the aluminum sulfate in the composition or solution is precipitated by the caustic lime within the cement and thereby forming crystals of calcium aluminum sulfate which spread over the entire surface of the concrete. The aluminates formed react with the water used in the solution or composition to form hydrated alumina. This hydrated alumina is, as is well known, a colloid and, when formed under the conditions as this solution is applied, constitutes a cementitious material which resets the exposed surface of the concrete. The sulfuric acid is added to produce the energy for the penetration that takes place and to supply an excess of sulfate for the production of the calcium aluminate crystals.

When concrete floors or platforms become old and worn, the dust from them is composed of the lime portions of the cement and as wearing down exposes the softer portions of the concrete, when our improved solution or composition is added to this character of surface, a great supply of calcium salts is supplied which form a considerable amount of aluminate crystals which results in a hard surface after setting.

We claim:

1. A composition for treating a concrete surface comprising aluminum sulfate, 16 oz., sulfuric acid, 1 oz., and water, 111 oz.

2. A liquid composition for treating a concrete surface including aluminum sulfate 16 oz. and sulfuric acid, 1 oz.

In testimony whereof we hereunto affix our signatures.

ANDREW R. GREEN.
HARRY L. ROSCOE.